United States Patent [19]

Onoda et al.

[11] 4,243,924

[45] Jan. 6, 1981

[54] SYSTEM FOR INTERPOLATING AN ARC FOR A NUMERICAL CONTROL SYSTEM

[75] Inventors: Fumio Onoda; Yutaka Kakizoe, both of Tokyo, Japan

[73] Assignee: Oki Electric Industry Co., Ltd., Tokyo, Japan

[21] Appl. No.: 916,225

[22] Filed: Jun. 16, 1978

[30] Foreign Application Priority Data

Jun. 28, 1977 [JP] Japan .................................. 52/76065

[51] Int. Cl.³ ............................................. G05B 19/25
[52] U.S. Cl. .................................. 318/573; 364/723
[58] Field of Search ........................... 318/573, 571, 39; 364/723

[56] References Cited

U.S. PATENT DOCUMENTS

| | | | |
|---|---|---|---|
| 3,109,092 | 10/1963 | Lott et al. | 364/723 |
| 3,225,182 | 12/1965 | Gotz | 364/723 |
| 3,416,056 | 12/1968 | Motooka et al. | 318/573 |
| 3,555,253 | 1/1971 | Seki | 318/573 X |
| 3,770,947 | 11/1973 | Deily | 318/573 X |
| 4,031,369 | 6/1977 | Heaman et al. | 318/573 X |

*Primary Examiner*—B. Dobeck
*Attorney, Agent, or Firm*—Frailey & Ratner

[57] ABSTRACT

The coordinates $(X_{n+1}, Y_{n+1})$ of an arc to be traced at time $t_{n+1}$ are preliminary calculated using the coordinates $(X_n, Y_n)$ at time $t_n$, the radius $(r)$ of the arc and a specified length $l_n$ during the time $t_{n+1} - t_n$, thus the number of the calculations required for tracing an arc is considerably reduced and a low speed digital element which is cheap can be utilized in the present arc interpolation system. The formula for obtaining the coordinates is;

$$X_{n+1} = X_n + Y_n \cdot l_n / r - X_n \cdot l_n^2 / 2r^2$$

$$Y_{n+1} = Y_n - X_n \cdot l_n / r - Y_n \cdot l_n^2 / 2r^2$$

The asymptotic change of the above formulae and the apparatus according to the asymptotic formulae is also possible.

1 Claim, 4 Drawing Figures

SYSTEM FOR INTERPOLATING AN ARC FOR A NUMERICAL CONTROL SYSTEM

BACKGROUND OF THE INVENTION

The present invention relates to an arc interpolation system for a numerical control system, in particular, relates to an arc interpolating system which calculates the next interpolation coordinates according to the present coordinates and a specified length.

A prior art interpolation circuit using the DDA (Digital Differential Analyzer) principle is shown in FIG. 1, in which an arc in the first quadrant is traced in the clock-wise direction. In FIG. 1, the reference numeral 1 is the input circuit, 2 is the X-register for storing the length of the X-component between the center of the arc and the initial point of the arc, 3 is the Y-register for storing the vertical length of the Y-component between the center of the arc and the initial point of the arc. 4 is the radius register, 5 is the feed speed register, 6 is the pulse generator, 9 is the summand register of the X-axis, 10 is the summand register of the Y-axis, 13 is the remainder register for storing the remainder (the less significant digits of the calculation) of the X-axis generated in the calculation, 14 is the remainder register for the Y-axis, and 15 and 16 are the motor drive circuits for the X-axis and the Y-axis, respectively.

At first, the input circuit 1 provides the value $IX_O$ which is the horizontal length between the center of the arc and the initial point of the arc to the register 2, the value $IY_O$, which is the vertical length between the center of the arc to the initial point of the arc, to the register 3, the radius (r) to the register 4, and the feed speed value (F) to the register 5. The pulse generator 6 generates a pulse train the frequency of which is $2^m F/r$ according to the outputs of the registers 4 and 5. It is supposed that $2^m \geq r$ is satisfied, and $2^m$ may be either a constant or the function of the radius (r). The constant $(IX_n)$ of the register 2 is transferred to the register 9 and the content $(IY_n)$ of the register 3 is transferred to the register 10 by the output pulse of the pulse generator 6. It should be appreciated that the initial value of the register 2 is $IX_O$ and the initial value of the register 3 is $IY_O$, and the initial value of the registers 13 and 14 is zero. The content $(IY_n)$ of the register 10 and the content $(RX_n)$ are added, and the less significant m bits $(RX_{n+1})$ of the addition $((RX_n+IY_n)/2^m)$ are restored in the register 13, and the overflow bit of said addition $((RX_n+IY_n)/2^m)$ is applied to the motor drive circuit 15 to drive the motor in the X-axis direction, and also said overflow bit is added to the content $(IX_n)$ of the register 2 and the sum $(IX_{n+1})$ of the addition is restored in the register 2. Similarly, the content $(IX_n)$ of the register 9 and the content $(RY_n)$ of the register 14 are added and the less significant m bits $(RY_{n+1})$ of the sum of the addition $((RY_n+IX_n)/2^m)$ are restored in the register 14, and the overflow bit of the sum of the addition $((RY_n+IX_n)/2^m)$ is applied to the motor drive circuit 15 to drive the motor in the Y-axis direction, and also said overflow bit is subtracted from the content $(IY_n)$ of the register 3, and the difference is restored in the register 3. The above calculations are repeated to trace the arc, thus the asymptotic formula is shown below.

$$IX_{n+1} + RX_{n+1}/2^m = IX_n + (RX_n + IY_n)/2^m \quad (1)$$

$$IY_{n+1} - RY_{n+1}/2^m = IY_n - (RY_n + IX_n)/2^m \quad (2)$$

In the above formula, it should be appreciated that $IX_n$ and $IY_n$ are the vector in the radius direction.

The disadvantage of the above prior art is that the calculation must be finished during a single period of the pulse train from the pulse generator 6, and when the circuit element is slow in operation, the frequency of the pulse generator 6 must be low resulting the low feed speed (F).

SUMMARY OF THE INVENTION

It is an object of the present invention to overcome the disadvantage of the prior art by providing a new and improved arc interpolation system. Another object of the present invention is to provide an arc interpolation system for a numerical control system in which the time allowed for each interpolation calculation can be relatively long, and a smooth arc results in spite of the length between the calculated points.

The above and other objects are attained by a system for controlling a variable speed having a starting position and a finish position with a predetermined time period between these positions. The system comprises means for generating the predetermined time period and means for providing a signal corresponding to the initial speed and position of the variable speed motor. Means is coupled to the generating means and the signal providing means for determining the values of the coordinates of the final position at the end of the time period. The speed of the variable speed motor is varied whereby at the end of the time period the motor reaches the final position. Further, means are provided for feeding back the coordinate values of the final position to the signal providing means, whereby the coordinate values become the coordinate values of the next initial position.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figures 1, 2:
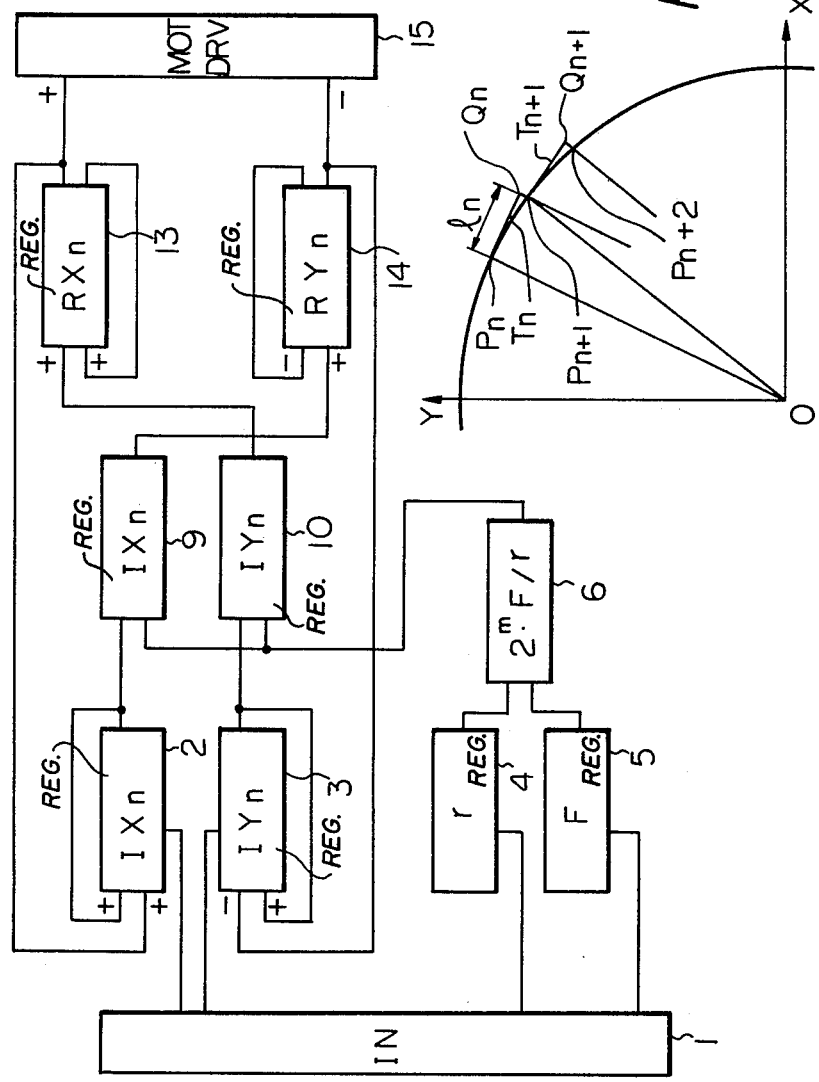
FIG. 1 is the block-diagram of the prior arc interpolation system.
FIG. 2 is the explanatory drawing for the explanation of the theoretical principle of the present invention.

First, the operational principle of the present invention is explained in accordance with FIG. 2, in which on the arc having the original (O) and the radius (r), the point $(P_n)$ at time $t_n$ is on the coordinates $P_n(x_n, y_n)$. The point $P_n$ is supposed to move by the length $l_n$ from time $t_n$ to time $t_{n+1}$, and the coordinates of said point at time $t_{n+1}$ is $P_{n+1}(x_{n+1}, y_{n+1})$. The point $Q_n(u_n, v_n)$ resides on the tangent $T_n$ which meets the arc at the point $P_n$. The length between the point $P_n$ and the point $Q_n$ is $l_n$. Further the straight line $\overline{P_{n+1}Q_n}$ is parallel to the line $\overline{P_nO}$. Accordingly, the following equations (3) through (7) are satisfied.

$$x_n^2 + y_n^2 = r^2 \tag{3}$$

$$x_{n+1}^2 + y_{n+1}^2 = r^2 \tag{4}$$

$$u_n - x_n = \frac{l_n}{r} y_n \tag{5}$$

$$v_n - y_n = -\frac{l_n}{r} x_n \tag{6}$$

$$y_{n+1} - v_n = \frac{y_n}{x_n}(x_{n+1} - u_n)$$

By solving the above equations, the following two formulae are obtained.

$$x_{n+1} = y_n \frac{l_n}{r} + x_n \sqrt{1 - \frac{l_n^2}{r^2}} \tag{8}$$

$$y_{n+1} = -x_n \frac{l_n}{r} + y_n \sqrt{1 - \frac{l_n^2}{r^2}} \tag{9}$$

Further, $l_n^2/r^2 < 1$ is satisfied, the formula (10) is derived.

$$\sqrt{1 - \frac{l_n^2}{r^2}} \approx 1 - \frac{l_n^2}{2r^2} \tag{10}$$

By substituting the formula (10) for the formulae (8) and (9), the formulae (11) and (12) are obtained.

$$x_{n+1} \approx x_n + y_n \frac{l_n}{r} - x_n \frac{l_n^2}{2r^2} \tag{11}$$

$$y_{n+1} \approx y_n - x_n \frac{l_n}{r} - y_n \frac{l_n^2}{2r^2} \tag{12}$$

It should be appreciated that the command to move to the point $P_{n+1}(x_{n+1}, y_{n+1})$ at time $t_{n+1}$ according to the above formulae, provides an approximate arc in which the moving speed is $l_n/(t_{n+1} - t_n)$.

Figure 3:
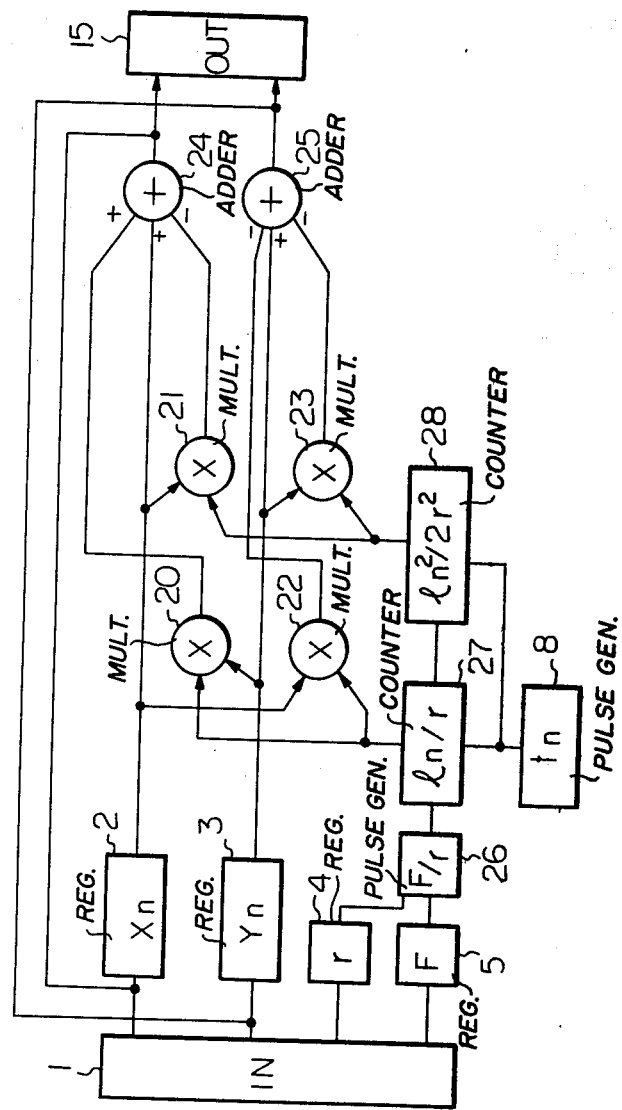
FIG. 3 is the block-diagram of the first embodiment of the present arc interpolation system.

FIG. 3 is the block-diagram of the first embodiment of the present arc interpolation circuit which operates in accordance with the formulae (11) and (12). In the figure, the reference numeral 1 is the input circuit, 2 is the X register for storing the value $X_n$, 3 is the Y register for storing the value $Y_n$, 4 is the radius register for storing the radius (r) of the arc, 5 is the feed speed register for storing the feed speed (F), 8 is the pulse generator for generating the timing pulse ($t_n$), 15 is the output circuit for applying the motor drive signal to the X— and Y— axes. 20, 21, 22 and 23 are multipliers, and 24 and 25 are adders.

First, the input circuit 1 provides the value $X_O$ and $Y_O$ which are the coordinates of the initial points of the arc to the registers 2 and 3 respectively. Also, the input circuit 1 provides the radius (r) and the feed speed (F) to the registers 4 and 5 respectively. The pulse generator 26 generates a pulse train the frequency of which relates to the value F/r according to the outputs of the registers 4 and 5. The pulse counters 27 and 28 count the number of output pulses from the pulse generator 26 and provide the outputs $l_n/r$ and $l_n^2/2r^2$ respectively when the time provided by the timing pulse generator 8 reaches $t_n$. Then, the multiplier 20 provides the product $y_n \cdot l_n/r$, the multiplier 21 provides the product $x_n \cdot l_n^2/2r^2$, the multiplier 22 provides the product $x_n \cdot l_n/r$, and the multiplier 23 provides the product $y_n \cdot l_n^2/2r^2$, respectively. Then, the adders 24 and 25 provide the values defined by the equations (11) and (12) respectively. When the values $x_{n+1}$ and $y_{n+1}$ are calculated, these values are applied to the registers 2 and 3, and then the new set of coordinates is calculated according to the equations (11) and (12) by the same operation as explained. When the command designating the position $P_{n+1}$ at time $t_{n+1}$ is applied to the system, the arc is traced with the tracing speed $l_n/(t_{n+1} - t_n)$.

Now, the second embodiment of the present invention will be explained.

The equations (11) and (12) are changed to the difference equations (13) and (14), and the apparatus operating with the equations (13) and (14) can perform the same operation as that of the equations (11) and (12).

$$IX_{n+1} + RX_{n+1}/2^m = IX_n + (RX_n + IY_n \cdot 2^m \cdot l_n/r - IX_n \cdot 2^m \cdot l_n^2/2r^2)/2^m \tag{13}$$

$$IY_{n+1} - RX_{n+1}/2^m = IY_n - (RY_n + IX_n \cdot 2^m \cdot l_n/r + IY_n \cdot 2^m \cdot l_n^2/2r^2)/2^m \tag{14}$$

Figure 4:
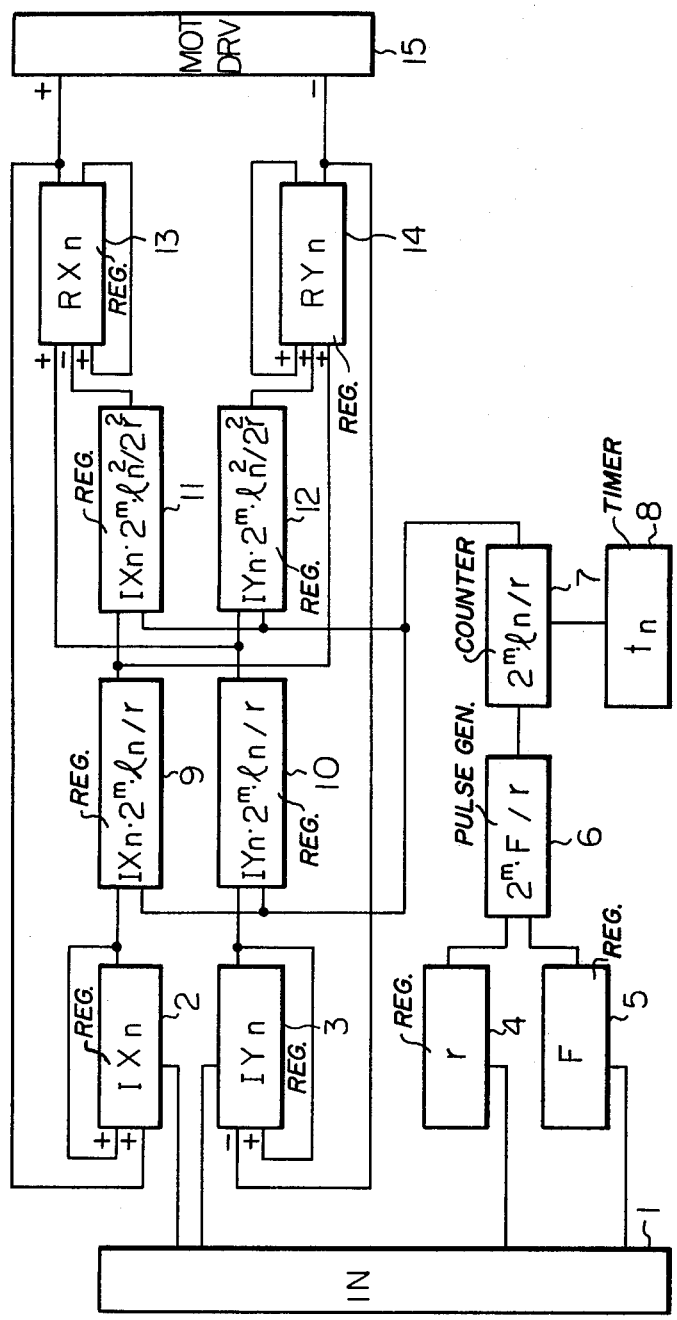
FIG. 4 is the block-diagram of the second embodiment of the present arc interpolation system.

FIG. 4 shows the block-diagram of the arc interpolation circuit which operates according to the equations (13) and (14). FIG. 4 is the embodiment in which the arc on the first quadrant on the X—Y plane is traced in the clock wise direction. In FIG. 4, the reference numeral 1 is the input circuit, 2 and 3 are registers for storing the coordinates ($X_n$, $Y_n$) on the arc, 4 is the radius register, 5 is the feed speed register, 6 is the pulse generator, 7 is the pulse counter, 8 is the timing circuit, 9 and 10 are registers for calculation and storage of the summand of the first order term for the Y axis and the X axis, respectively. 11 and 12 are registers for calculating and storing the summand of the second order term for the X axis and the Y axis, respectively. 13 and 14 are registers for calculating and storing the remainder (the less significant bits) for the X axis and the Y axis, respectively, and 15 is the motor drive circuit for applying the drive signals of the X axis and the Y axis to the motor.

The operation of FIG. 4 is explained below.

The input circuit 1 applies the initial coordinates $IX_O$ and $IY_O$ of the arc to the registers 2 and 3, respectively. The input circuit 1 also applies the radius (r) of the arc to the register 4 and the feed speed (F) to the register 5. The pulse generator 6 generates a pulse train the frequency of which is $2^m \cdot F/r$ according to the outputs of the registers 4 and 5. It is supposed that $2^m \geq r$ is satisfied and the value $2^m$ may be either a constant or the function of the radius (r). The pulse counter 7 counts the output pulses of the pulse generator 6, and provides the output of the counted value $2^m \cdot l_n/r$ when the timing pulse generator 8 reaches the time $t_n$. The content of the counter 7 returns to zero when the counter 7 provides said output signal. The register 9 calculates the primary summand $IX_n \cdot 2^m \cdot l_n/r$ of the Y axis from the content $IX_n$ of the register 2 (the initial value of that content is $IX_O$) and the output $2^m \cdot l_n/r$ of the pulse counter 7, and stores the result in the register 9. The register 10 calculates the primary summand $IY_n \cdot 2^m \cdot l_n/r$ of the X axis from the content of $IY_n$ of the register 3 (the initial value of that content is $IY_O$) and the output $2^m \cdot l_n/r$ of the pulse counter 7, and stores the result in the register 10. The register 11 calculates the secondary summand $IX_n \cdot 2^m \cdot l_n^2/2r^2$ of the X axis from the content of the register 9 and the output of the pulse counter 7, and stores the result in the register 11. The register 12 calculates the secondary summand $IY_n \cdot 2^m \cdot l_n^2/2r^2$ of the Y axis from the content of the register 10 and the output of the pulse counter 7, and stores the result in the register 12. The content $RX_n$ of the register 13 and the content of the register 10 are added and the content of the register 11 is subtracted from the sum of the addition in the register 13. The result of said addition and subtraction is divided by $2^m$ in said register 13, and the remainder $RX_{n+1}$ of the division is stored in the register 13 and the quotient of the division is applied to the motor drive circuit 15 to drive the X axis in the positive direction. Said quotient is also added to the content of the register 2 in which the sum $(IX_{n+1})$ is stored as the revised value of IX. Similarly, the content $RY_n$ of the register 14 and the content of the register 9 are added, and sum of said addition and the content of the register 12 are added again. The sum of those additions is divided by $2^m$ in the register 14, and the remainder $RY_{n+1}$ of the division is stored in the register 14 and the quotient of the division is applied to the motor drive circuit 15 to drive the Y axis in the negative direction. Said quotient is also applied to the register 3 and the content of the register 3 is subtracted by said quotient. The difference of the subtraction ($=IY_{n+1}$) is stored in the register 3. The above operation is repeated and thus the arc is traced. Although the divisor in the embodiment is $2^m$, a circuit using the divisor (r) is also possible.

Some modifications of the above embodiments are of course possible. For instance, when the arc is traced in the anti-clock-wise direction, or the arc to be traced is in a quadrant other than the first quadrant, the connection among the registers 2, 9, 11, and 13, and the connection among the registers 3, 10, 12, and 14 have only to be changed, and/or the command direction of the motor drive circuit 15 must be changed.

Also, the motor drive circuit can include a linear interpolation circuit which commands the movement from the present point on the arc to the next commanded point on the arc.

The tracing error according to the present invention is only $l_n^4/4r^4$ in the equation (10), a negligibly small error, and so although the length $l_n$ is long, an accurate arc can be obtained. For instance, when $r=70000$ (pulses) and $l_n=250$ (pulses), and the arc interpolation is carried out in the first quadrant, the error of the radius at the final point of the arc is less than 1 (pulses). In this case, only 440 calculations ($\pi/2 \times 70000/250 = 440$) are necessary in the present invention. While in a prior arc interpolation system, about 110,000 calculations are necessary ($\pi/2 \times 70000 = 110000$). Accordingly, it is apparent that the present invention can take 250 times longer than the prior art for each calculation. Thus, a digital element of slow operational speed, and high interpolation speed can coexist in the present invention.

Further, it should be appreciated that all the calculating means in the present apparatus can be replaced by a programmed micro-computer provided on a single chip.

From the foregoing it will now be apparent that a new and improved arc interpolation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. In a numerical control machine for generating a curve a system for controlling a variable speed motor having a starting position and a finish position with a predetermined time period between the initial and finish positions which comprises
   (a) means for generating said predetermined time period;
   (b) means for providing a signal corresponding to the initial speed and position of said variable speed motor;
   (c) means coupled to said generating means and said signal providing means for determining the values of the coordinates of the final position at the end of said time period;
   (d) means for varying the speed of said variable speed motor whereby at the end of said time period said motor reaches said final position, and
   (e) means for feeding back said coordinate values of said final position to said signal providing means whereby said coordinate values become the coordinate values of the next initial position.

* * * * *